US010259361B2

(12) United States Patent
Bourde et al.

(10) Patent No.: US 10,259,361 B2
(45) Date of Patent: Apr. 16, 2019

(54) FORMING OF A STITCH IN A MOTOR VEHICLE SEAT COVER

(71) Applicant: FAURECIA SIEGES D'AUTOMOBILE, Nanterre (FR)

(72) Inventors: Philippe Bourde, Echenoz-la-Meline (FR); Didier Fouinat, Saint Cheron (FR); Olivier Rigal, Etampes (FR); François Mailliez, Caudry (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 86 days.

(21) Appl. No.: 15/165,745

(22) Filed: May 26, 2016

(65) Prior Publication Data
US 2017/0080839 A1 Mar. 23, 2017

(30) Foreign Application Priority Data
Sep. 17, 2015 (FR) ...................... 15 58769

(51) Int. Cl.
*B60N 2/58* (2006.01)
*B60N 2/70* (2006.01)
*B32B 7/08* (2019.01)
*B32B 7/00* (2019.01)

(52) U.S. Cl.
CPC .............. *B60N 2/5891* (2013.01); *B32B 7/00* (2013.01); *B32B 7/08* (2013.01); *B60N 2/5883* (2013.01); *B60N 2/7017* (2013.01); *B32B 2605/00* (2013.01); *B32B 2605/003* (2013.01); *B32B 2605/08* (2013.01)

(58) Field of Classification Search
CPC .... B60N 2/5891; B32B 2038/008; B32B 1/00
USPC .............. 112/61, 85, 235, 240, 244, 475.02, 112/475.03, 475.22, 475.26
See application file for complete search history.

(56) References Cited

U.S. PATENT DOCUMENTS

| | | | | | |
|---|---|---|---|---|---|
| 2,960,948 | A | * | 11/1960 | Weir | ...................... D05B 35/02 112/151 |
| 3,696,771 | A | * | 10/1972 | Ambrose | ............. B60N 2/5883 112/417 |
| 4,040,881 | A | * | 8/1977 | Wallace | .................... B32B 7/08 156/93 |
| 4,323,410 | A | * | 4/1982 | Urai | .................... B29C 44/5636 156/228 |
| 4,792,371 | A | * | 12/1988 | Miyota | .................. B32B 38/06 156/211 |

(Continued)

FOREIGN PATENT DOCUMENTS

| | | |
|---|---|---|
| CN | 102131637 A | 7/2011 |
| EP | 2703154 A1 | 3/2014 |

(Continued)

OTHER PUBLICATIONS

Preliminary Search Report for French Application No. 15/58769 dated Jul. 7, 2016, 2 pages.

*Primary Examiner* — Timothy J Brindley
(74) *Attorney, Agent, or Firm* — Moreno IP Law LLC

(57) ABSTRACT

A method of forming a stitch in a motor vehicle seat cover piece, including a foam layer and a lining material defining the apparent surface of the cover, wherein a groove formed on molding of the cover piece defines the pattern of the stitch and is used as a guide.

13 Claims, 3 Drawing Sheets

(56) References Cited

U.S. PATENT DOCUMENTS

| | | | | |
|---|---|---|---|---|
| 4,925,513 A * | 5/1990 | Witzke | ............... | A43B 3/0078 |
| | | | | 156/213 |
| 5,017,413 A * | 5/1991 | Moschini | ............ | A47C 21/026 |
| | | | | 112/405 |
| 5,382,398 A * | 1/1995 | Draxlmaier, Jr. | ........ | B60R 13/02 |
| | | | | 112/470.27 |
| 5,517,933 A * | 5/1996 | Karaba, Jr. | .............. | D05B 1/08 |
| | | | | 112/166 |
| 5,669,670 A * | 9/1997 | Haraguchi | ............ | B29C 44/141 |
| | | | | 297/219.1 |
| 6,792,883 B2 * | 9/2004 | Ashton | ................. | D05B 31/00 |
| | | | | 112/235 |
| 2009/0146483 A1 * | 6/2009 | Niwa | ..................... | B60N 2/58 |
| | | | | 297/452.61 |
| 2011/0135875 A1 * | 6/2011 | Graham | ............... | B60N 2/5891 |
| | | | | 428/131 |
| 2013/0147228 A1 * | 6/2013 | Filipp | .................... | B60R 13/02 |
| | | | | 296/70 |
| 2013/0153122 A1 | 6/2013 | Filipp et al. | | |
| 2013/0305974 A1 * | 11/2013 | Ishii | ....................... | D05B 23/00 |
| | | | | 112/475.08 |
| 2014/0042767 A1 * | 2/2014 | Filipp | ...................... | B32B 7/08 |
| | | | | 296/70 |
| 2015/0361605 A1 * | 12/2015 | Nakata | .............. | D05B 35/0064 |
| | | | | 112/475.16 |
| 2016/0031350 A1 * | 2/2016 | Smith | .................. | B60N 2/5825 |
| | | | | 297/452.48 |
| 2016/0167260 A1 * | 6/2016 | Thomas | ................ | B29C 44/14 |
| | | | | 428/304.4 |
| 2016/0368405 A1 * | 12/2016 | Ishii | ...................... | B60N 2/5891 |
| 2016/0375808 A1 * | 12/2016 | Etienne | ............... | B60N 2/5891 |
| | | | | 297/452.61 |

FOREIGN PATENT DOCUMENTS

| | | |
|---|---|---|
| FR | 2943270 A1 | 9/2010 |
| WO | 2015015131 A1 | 2/2015 |
| WO | 2015032070 A1 | 3/2015 |

* cited by examiner

US 10,259,361 B2

FORMING OF A STITCH IN A MOTOR VEHICLE SEAT COVER

BACKGROUND

The present disclosure generally relates to motor vehicle seats and, more specifically, to covers for such seats. The present disclosure more specifically relates to the forming of a stitch in a motor vehicle seat cover.

DISCUSSION OF RELATED ART

Motor vehicle seat covers include, in particular, covers which are at least partly made in the form of a foam layer, relatively thin as compared with the thickness of the padding on which they are arranged, the foam layer being covered with a lining made of leather, skin, woven or nonwoven textile, synthetic material, etc. defining the apparent surface of the seat element upholstery.

Such covers or cover elements are for example described in document FR A 2942423.

SUMMARY

An embodiment provides a technique for forming a stitch in a cover element or a cover of the type comprising a foam layer.

An embodiment provides a forming technique compatible with the forming of a decorative stitch of style feature line type.

An embodiment provides making the forming of a stitch according to a desired pattern easier.

Thus, an embodiment provides a method of forming a stitch in a motor vehicle seat cover piece, comprising a foam layer and a lining material defining the apparent surface of the cover, wherein a groove formed on molding of the cover piece defines the pattern of the stitch and is used as a guide.

According to an embodiment, the groove is present on the lining material side.

According to an embodiment, the groove is used as a guide for a sewing machine foot.

According to an embodiment, the groove is used as a guide for feed dogs of the sewing machine.

According to an embodiment, the groove is present on the foam layer side.

According to an embodiment, the groove is used as a guide for a sewing machine gauge.

According to an embodiment, the gauge is arranged on the side of the foot opposite to a needle.

According to an embodiment, the stitch is exclusively decorative.

An embodiment provides a cover for a motor vehicle seat comprising at least one piece provided with a groove having a stitch formed therein as an application of the above method.

According to an embodiment, the piece is obtained by cold forming of foam arranged on the reverse side of the lining material.

An embodiment also provides a motor vehicle seat element, comprising:

a foam support block; and a cover.

An embodiment also provides a motor vehicle seat comprising at least one seat element.

BRIEF DESCRIPTION OF THE DRAWINGS

The foregoing and other features and advantages will be discussed in detail in the following non-limiting description of specific embodiments in connection with the accompanying drawings.

DETAILED DESCRIPTION OF THE PRESENT EMBODIMENTS

Figure 1:
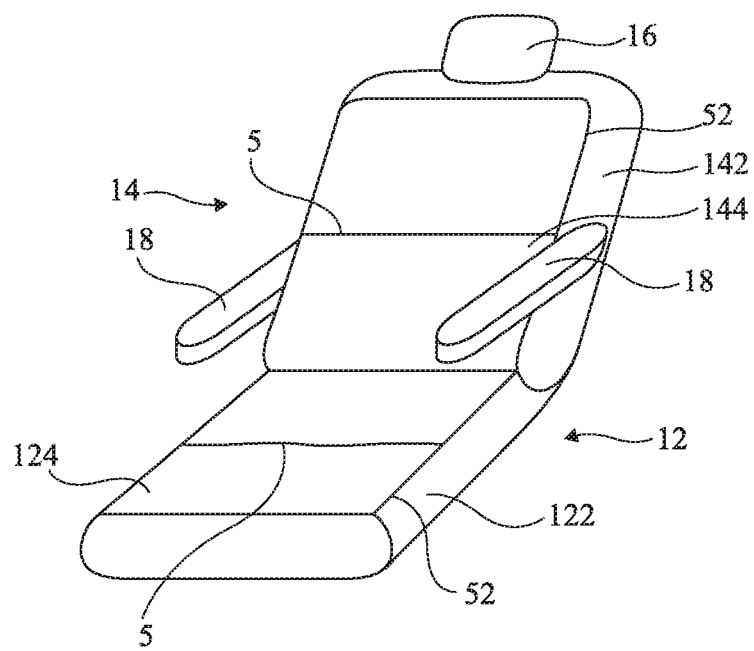
FIG. 1 is a simplified representation of an example of a motor vehicle seat of the type to which the embodiments which will be described apply.

For clarity, only those steps and elements which are useful to the understanding of the described embodiments have been shown and will be detailed. In particular, the forming by spraying and then molding of the cover element or cover piece equipped with foam on its back side has not been detailed, the described embodiments being compatible with usual techniques and in particular with those described in document FR A 2942423.

It should be noted that, in the drawings, the structural and/or functional elements common to the different embodiments may be designated with the same reference numerals and may have identical structural, dimensional, and material properties.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, it is referred to the orientation of the drawings. Unless otherwise specified, expressions approximately, substantially, and in the order of mean to within 10%, preferably to within 5%.

FIG. 1 is a simplified representation of an example of a motor vehicle seat of the type to which the embodiments which will be described apply.

Such a seat is generally formed of a seat bottom part 12, supported by the vehicle floor (for example, via slide rails, not shown), of a backrest 14, possibly topped with a headrest 16. Seat bottom part 12 may be equipped with one or two armrests 18.

The different seat elements (seat bottom part 12, backrest 14, headrest 16, armrest(s) 18) are each formed of upholstery (padding covered with a cover). In FIG. 1, only the apparent portion of the seat, and thus, the cover of the different elements, has been illustrated. The covers of the different elements are, for example, formed of pieces 122 and 124 for seat bottom part 12, 142 and 144 for backrest 14, assembled together by sewing 52. The apparent surfaces of the cover pieces are for example made of leather, of skin, of woven or nonwoven textile, of synthetic material, etc.

In seats to which the present invention more specifically applies, at least some of the cover pieces comprise, on their back side, a foam layer which is relatively thin (less than approximately 1 cm) with respect to the thickness of a foam support block having the cover placed thereon. Such cover pieces are, for example, cover elements such as described in document FR A 2942423.

Figure 2:
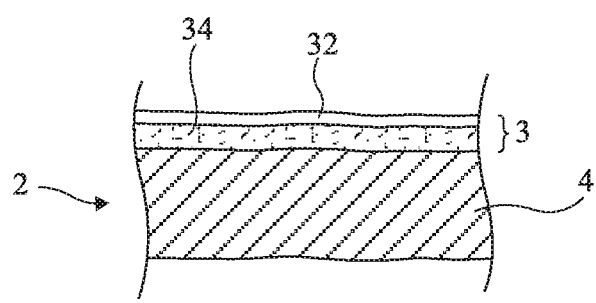
FIG. 2 is a cross-section view of an embodiment of upholstery of a motor vehicle seat element.

FIG. 2 is a simplified cross-section view of such seat element upholstery 2. Cover 3, also called cover element in this technology, comprises a lining 32 (for example, made of leather, of skin, of woven or nonwoven textile, of synthetic material, etc.) defining the apparent surface of upholstery 2 and, at the rear surface, a thin foam layer 34. The cover is arranged on a thicker foam layer 4, forming the padding of the seat element. According to the areas of the seat element, the thickness of layer 4 varies, and may even be omitted. Pieces 122 and 142 of FIG. 1 are manufactured according to this technique.

Upholstery 2 is preferably obtained by cold forming. For example, a lining piece 32 intended to form the apparent surface is stretched in a frame. Separately, foam is sprayed on a polyethylene substrate. Then, the substrate coated with foam is arranged on piece 32, its foam surface against the textile, in a press having its die and its punch defining the shapes desired for the upholstery. The assembly is then submitted to a cold forming, which comprises applying a pressure while the foam is in the viscous state.

For reasons of appearance, a stitch may be desired to be formed in a cover element. Such stitches define so-called style feature lines giving the seat a stitched trim aspect.

However, in a cover element of the type to which the described embodiments apply, that is, with a foam layer on the back side, the stitch pattern raises an issue. In particular, the sewing machine or its operator is guided by a marking which, in the cover elements, can only be formed on the back side to avoid marking the apparent surface, which generates inaccuracies in the stitch pattern.

The described embodiments more specifically apply to the forming of decorative stitches. However, another cover piece may possibly also be assembled to that having the decorative stitch formed therein.

Figure 3:
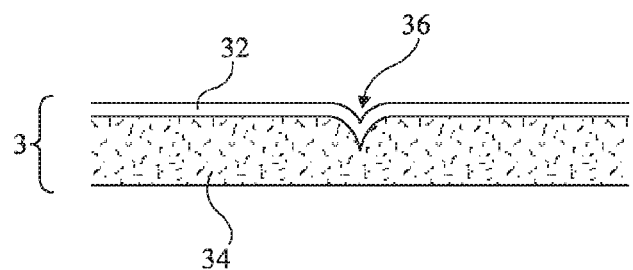
FIG. 3 is a partial simplified cross-section view of an embodiment of a cover element.

FIG. 3 is a partial simplified cross-section view of an embodiment of a cover element.

Figure 4:
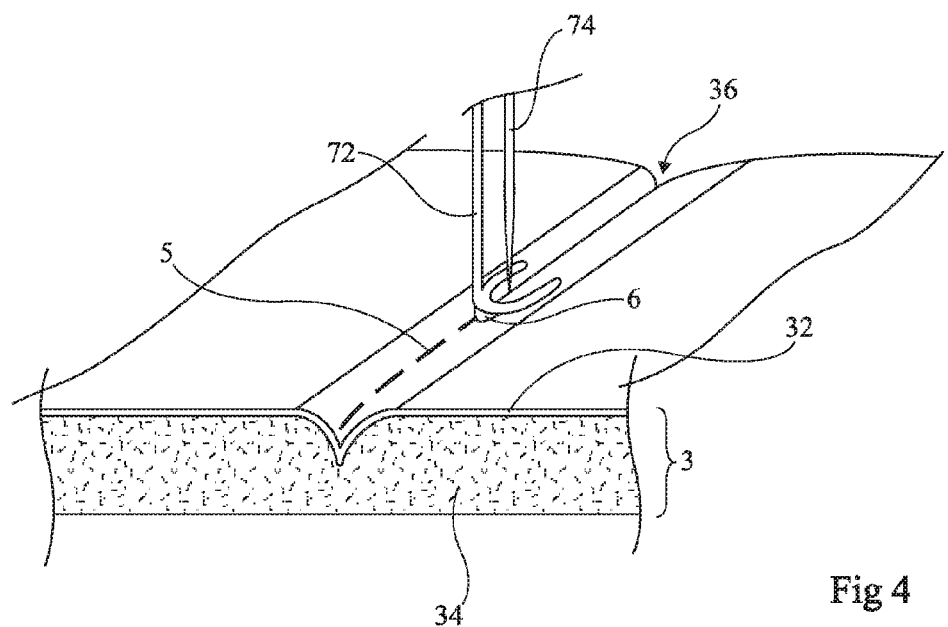
FIG. 4 is a perspective view illustrating the forming of a decorative stitch in the cover element of FIG. 3.

FIG. 4 is a perspective view of the cover element illustrating the forming of a decorative stitch in the cover element of FIG. 3.

According to this embodiment, one forms, in a cover piece 3 comprising a foam layer 34 and an external lining 32, a grove 36, preferably V-shaped, for guiding the sewing machine. In the embodiment of FIG. 3, the groove is formed on the front side, that is, on the side of the lining element or apparent surface of the finished seat.

Groove 36 has a double function: it predefines the style feature line and it guides the sewing machine or its operator. It is thus ascertained that the pattern of decorative stitch 5 (FIG. 4) effectively follows that desired for the style feature line and, in particular in this case, the bottom of the groove.

FIG. 4 illustrates an example of possible guiding of a sewing machine by means of such a groove 36. According to this example, the machine (very partially shown by its foot 72 and its needle 74), comprises at the front of the foot in the sewing direction, that is, the side opposite to needle 74, a gauge or guide head 6, preferably aligned with the foot and the needle in the direction of the stitch to be formed. Gauge 6 is preferably blunt to avoid damaging lining 32, intended to be engaged into groove 36 to guide the sewing. As a specific embodiment, gauge 6 has a rounded-tip triangular, trapezoidal, ovoid shape, etc.

Gauge 6 is however not compulsory. According to another embodiment, the groove width is such that foot 72 can partially engage therein, which ensures the guiding function. According to still another embodiment, groove 62 is used as a visual guide for an operator. According to still another embodiment, an optical guiding is performed, a camera identifying the groove by contrast with respect to the rest of the piece.

Groove 36 is obtained on molding of cover piece or cover element 3. In practice, an insert is provided in a mold for obtaining piece 3 to define groove 36. The foam thickness at the groove level is thus smaller than in the rest of piece 3. For example, the lining which has had foam sprayed on its back side is placed in a forming mold and, on hardening of foam 34, it will take the desired shape with groove 36.

Groove 36 may follow any pattern (straight, sinuous, etc.).

The depth of groove 36 is preferably selected so that the thread of stitch 5 houses therein. This thus avoids any overthickness once the cover is finished. Stitch 5 is thus protected from abrasion.

Figure 5:
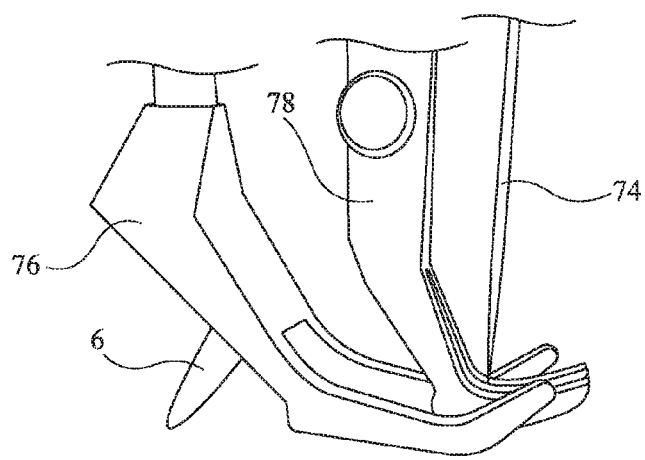
FIG. 5 is a lateral view of an embodiment of a sewing machine foot capable of forming a decorative stitch in the cover element of FIG. 2.

FIG. 5 is a lateral view of an embodiment of a sewing machine foot capable of forming a stitch in groove 36 of the cover element.

According to this embodiment, it is a walking foot, comprising a presser foot 76 having feed dogs 78 in its fork. The presser foot permanently remains in contact with the work while the feed dogs rise and fall along the sewing, the needle penetrating into the work when the feed dogs are in low position.

According to the embodiment shown in FIG. 5, a guiding gauge 6 equips the front of the presser foot, that is, its side opposite to the aperture of the fork. Gauge 6 is intended to engage into guiding groove 6 to make the guiding easier.

As a variation, feed dogs 78 is also used as a guide by partially coming down into groove 36 having its width then adapted for this purpose.

An advantage of the forming of a guiding groove is that this improves the accuracy of the pattern of the style feature line. Indeed, it is now possible to provide the guiding from the apparent surface, which is not possible with a marking.

Another advantage is that this can also be used when the groove is formed on the back side.

Figure 6:
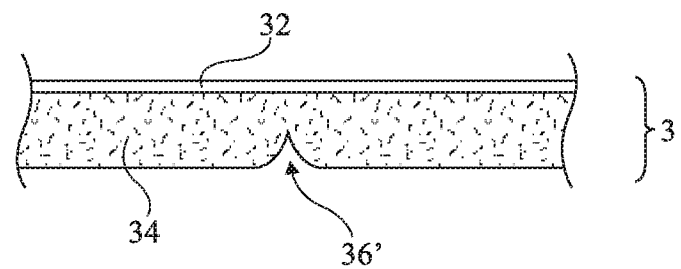
FIG. 6 is a cross-section view illustrating another embodiment of a cover element and of the stitch forming method.

FIG. 6 is a cross-section view illustrating another embodiment of a cover element and of the stitch forming method.

According to this embodiment, a groove 36' is formed on the back side of cover element 3. Such a forming is, for example, intended for the case where the stitch is not desired to be sunk into the cover element on the front surface side.

The sewing is still performed from the front side but the pattern is guided by a gauge (6, FIG. 4) arranged on the bed side of the sewing machine.

As compared with an embodiment where the pattern is marked on the back side, the positioning is here more accurate since it is defined by the mold for forming the cover element and is thus identically repeated from one piece to the other.

Figure 7:
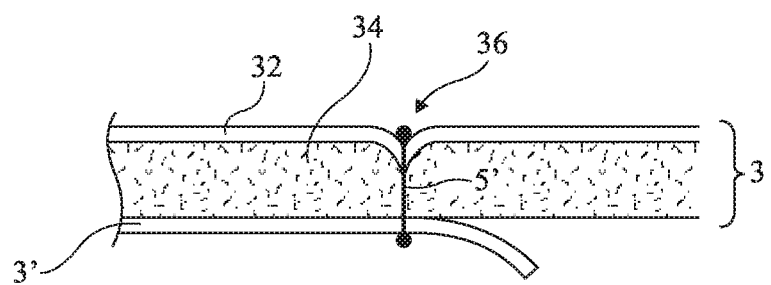
FIG. 7 illustrates another embodiment where the stitch is also used as a seam.

FIG. 7 illustrates another embodiment where stitch 5' is also used as a seam.

In this case, a second cover piece 3' (with or without foam) is placed under piece 3 with the area to be sewn in line with groove 36. Stitch 5' then crosses piece 3 in groove 36 and piece 3'.

An advantage of the described embodiments is that it is possible to reproducibly form decorative stitches in cover pieces comprising a foam layer on their back side.

Various embodiments have been described, various alternations, modifications, and improvements will occur to those skilled in the art. In particular, the selection of the dimensions of groove 36 depends on the embodiments. As a specific embodiment, a groove having a depth from one to a few millimeters and a width from a few millimeters to a few centimeters may be provided. Further, the practical implementation of the described embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of forming a stitch in a motor vehicle seat cover piece, comprising:

forming, upon molding of a foam layer and a lining material defining an apparent surface of the cover, a groove of the cover piece that defines a pattern of the stitch, wherein the groove is configured to have a width that facilitates engagement with a component of a sewing machine; and forming the stitch in the groove of the cover piece using the groove as a guide for the component of the sewing machine.

2. The method of claim 1, wherein the groove is formed on a side of the lining material.

3. The method of claim 2, wherein the groove is used as a guide for a sewing machine foot.

4. The method of claim 3, wherein he groove is used as a guide for feed dogs of the sewing machine.

5. The method of claim 1, wherein the groove is formed on a side of the foam layer.

6. The method of claim 1, wherein the groove is used as a guide for a sewing machine gauge.

7. The method of claim 6, wherein the gauge is deposited on a side of a foot opposite to a needle.

8. The method of claim 1, wherein the stitch is decorative.

9. A cover for a motor vehicle seat, comprising at least one piece provided with a groove having a stitch formed therein in accordance with the method of claim 1.

10. The method of claim 1, wherein forming the groove of the cover further comprises cold forming of foam arranged on a reverse side of the lining material.

11. A motor vehicle seat element, comprising:
    a foam support block; and
    the cover of claim 9.

12. A motor vehicle seat comprising at least one seat element of claim 11.

13. The method of claim 1, wherein forming the groove further comprises forming the groove to have a V-shape.

* * * * *